(12) United States Patent
Henning et al.

(10) Patent No.: US 10,737,882 B2
(45) Date of Patent: Aug. 11, 2020

(54) ADHESION AGING PROTECTION IN CORDED RUBBER ARTICLES

(71) Applicant: ContiTech USA, Inc., Fairlawn, OH (US)

(72) Inventors: Katja Henning, Goettingen (DE); Stefan Sostmann, Langenhagen (DE); Stavros Podias, Göttingen (DE); Thomas George Burrowes, North Canton, OH (US)

(73) Assignee: ContiTech USA, Inc., Fairlawn, OH (US)

( * ) Notice: Subject to any disclaimer, the term of this patent is extended or adjusted under 35 U.S.C. 154(b) by 0 days.

(21) Appl. No.: 16/393,995

(22) Filed: Apr. 25, 2019

(65) Prior Publication Data

US 2019/0291957 A1      Sep. 26, 2019

Related U.S. Application Data

(63) Continuation-in-part of application No. 15/933,400, filed on Mar. 23, 2018, now Pat. No. 10,442,625.

(51) Int. Cl.
*B65G 15/34*    (2006.01)
*C08K 3/22*     (2006.01)
*C08K 13/02*    (2006.01)
*B65G 15/36*    (2006.01)
*C08K 5/098*    (2006.01)

(52) U.S. Cl.
CPC ............ *B65G 15/34* (2013.01); *B65G 15/36* (2013.01); *C08K 3/22* (2013.01); *C08K 5/098* (2013.01); *C08K 13/02* (2013.01); *C08K 2003/2296* (2013.01)

(58) Field of Classification Search
CPC ........ B65G 15/34; B65G 15/36; B65G 15/38; B65G 2201/06; C08K 3/22; C08K 2003/2296; C08K 13/02; C08K 5/098; B32B 27/06; B32B 27/40; B32B 15/06; B32B 2433/02; B32B 2307/554; B32B 2307/3065; B32B 2307/54; B32B 25/12
USPC ......................................................... 198/847
See application file for complete search history.

(56) References Cited

U.S. PATENT DOCUMENTS

| | | | |
|---|---|---|---|
| 3,973,670 A | | 8/1976 | Spaar |
| 4,004,467 A | * | 1/1977 | Kenney ................. B65G 15/34 198/321 |
| 4,547,422 A | * | 10/1985 | Oliver .................... B65G 15/34 156/137 |
| 4,674,622 A | | 6/1987 | Utsunomiya et al. |

(Continued)

*Primary Examiner* — James R Bidwell
(74) *Attorney, Agent, or Firm* — David L. Cate; Gregory Adams

(57) ABSTRACT

A conveyor belt including a carry cover layer, a reinforcement layer which is situated below the carry cover layer, and a pulley cover layer which is situated below the reinforcement layer, where the reinforcement layer is comprised of steel cordage and rubber matrix, and wherein the rubber matrix includes zinc oxide in an amount greater than 5 phr and a cobalt derivative in an amount of 1 phr or greater. In some cases, the rubber matrix includes zinc oxide in an amount of 11 phr or greater, or even in an amount of 16 phr or greater. In some cases, the rubber matrix includes the cobalt derivative in an amount of 2 phr or greater, or even in an amount of from 3 phr to 4 phr. In some aspects, the rubber matrix is devoid of lead oxide.

15 Claims, 2 Drawing Sheets

(56) References Cited

U.S. PATENT DOCUMENTS

| | | | |
|---|---|---|---|
| 4,745,023 | A | 5/1988 | Chapman et al. |
| 5,609,242 | A | 3/1997 | Hutchins et al. |
| 6,884,832 | B2 | 4/2005 | Wentworth et al. |
| 9,580,249 | B2 | 2/2017 | Si et al. |
| 2002/0036129 | A1 | 3/2002 | Breed et al. |
| 2002/0061409 | A1 | 5/2002 | Topp et al. |
| 2003/0106300 | A1 | 6/2003 | Bruyneel et al. |
| 2004/0035686 | A1 | 2/2004 | Allen et al. |
| 2008/0269385 | A1 | 10/2008 | Alexander et al. |
| 2012/0031742 | A1* | 2/2012 | Nakano .................. B29D 29/06 198/847 |
| 2015/0034458 | A1 | 2/2015 | Burrowes et al. |
| 2018/0170006 | A1* | 6/2018 | Miyamoto ............. C09J 109/00 |

\* cited by examiner

ADHESION AGING PROTECTION IN CORDED RUBBER ARTICLES

RELATED APPLICATION INFORMATION

This patent application is a Continuation-In-Part application of, and claims priority to, U.S. Nonprovisional patent application Ser. No. 15/933,400 filed Mar. 23, 2018, which is incorporated herein in its entirety, by reference.

FIELD

The field to which the disclosure generally relates is rubber articles containing metal reinforcements therein, and in particular, conveyor belts having zinc coated steel reinforcement cords therein.

BACKGROUND

This section provides background information to facilitate a better understanding of the various aspects of the disclosure. It should be understood that the statements in this section of this document are to be read in this light, and not as admissions of prior art.

Many rubber articles, such as conveyor belts, automobile tires, hoses, power train belts, e.g., transmission belts, and the like, are usually reinforced with fibrous or metal cords. In all such instances, the fiber or metal cord must be firmly bonded to the rubber. This is so whether the fiber or cord is a natural or synthetic polymer, or metallic, and whether the rubbers are natural or synthetic.

Conventional conveyor belts which are used in heavy duty applications are typically comprised of a cured rubber or polyvinyl chloride (PVC) based material as a top layer, a cured rubber or PVC based material as a bottom layer, and one or more reinforcement layers (a carcass) disposed between the top layer and the bottom layer. The cured rubber or polyvinyl chloride based material may also serve to adhere various components of the reinforcing carcass. For example, individual layers and reinforcing elements included in the carcass may be encapsulated in a matrix of polymeric elastomeric resin, such as a polyvinylchloride based material. The individual layers are commonly saturated with the liquid elastomer-forming polymeric resin prior to being joined together, and the reinforcing elements may be inserted, for example, by tufting, sewing, or stitch-bonding. In cases where the liquid saturate is a polyvinylchloride plastisol, the resin is gelled, or otherwise cured, by application of heat.

Some conveyor belts contain reinforcement elements which include zinc coated steel cords. Conveyor belts of these types can offer excellent performance characteristics and a relatively long service life. However, under some conditions where the conveyor belts are exposed to repeated high temperatures and/or humidity over long periods of time, the zinc coated steel cord reinforcements can delaminate, or otherwise lose adhesion, from the rubber matrix of the conveyor belt.

For bonding the rubber to the zinc coated steel cord surface, special rubber formulations have been known to be used in the form of adhesion compounds. One solution to provide protection against aging/corrosion and loss of adhesion has been addition of lead oxide (PbO). However, PbO is considered a hazardous substance and is rated as SVHC substance in the REACH regulation, which could ultimately be banned for use. Also, currently available alternative compounds without PbO can achieve good adhesion to the cord surface, but the generated bonding is more susceptible to aging/corrosion than with compounds containing PbO.

Thus, there is an ongoing need for conveyor belts including zinc coated steel cordage with improved bonding between the zinc coated steel cord surface and rubber matrix, while be exposed to thermal and/or humidity aging conditions. Such needs are met, at least in part, with embodiments according to the following disclosure.

SUMMARY

This section provides a general summary of the disclosure, and is not necessarily a comprehensive disclosure of its full scope or all of its features.

In a first aspect of the disclosure, a conveyor belt includes a carry cover layer, a reinforcement layer which is situated below the carry cover layer, and a pulley cover layer which is situated below the reinforcement layer, where the reinforcement layer has steel cordage and rubber matrix, and wherein the rubber matrix includes zinc oxide in an amount greater than 5 phr and a cobalt derivative in an amount of 1 phr or greater. In some cases, the rubber matrix includes zinc oxide in an amount of 11 phr or greater, or even in an amount of 16 phr or greater. In some cases, the rubber matrix includes the cobalt derivative in an amount of 1 phr or greater, or even in an amount of from 3 phr to 4 phr. In some aspects, the rubber matrix is devoid of lead oxide. In some embodiments, the steel cordage is zinc coated steel cords.

In yet other aspects of the disclosure, a rubber article includes a reinforcement layer, where the reinforcement layer has steel cordage and rubber matrix, and where the rubber matrix comprises zinc oxide in an amount greater than 5 phr and a cobalt derivative in an amount of 1 phr or greater. In some cases, the rubber matrix includes zinc oxide in an amount of 11 phr or greater, or even in an amount of 16 phr or greater. In some cases, the rubber matrix includes the cobalt derivative in an amount of 2 phr or greater, or even in an amount of from 3 phr to 4 phr. In some aspects, the rubber matrix is devoid of lead oxide.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
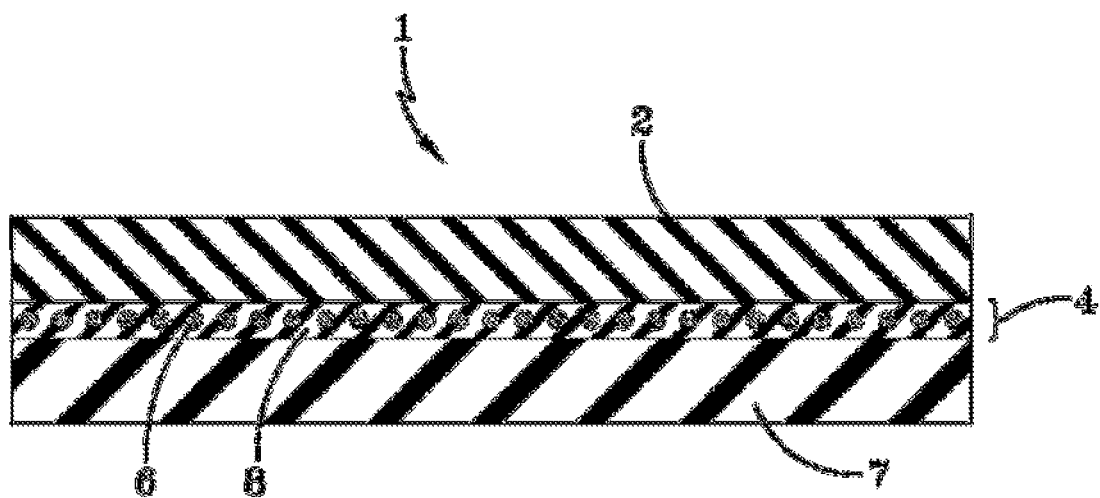
FIG. 1 is a cross-sectional view of a conveyor belt having a carry cover layer, a reinforcement layer which is situated below the carry cover layer, where the reinforcement layer includes steel reinforcing elements, and a pulley cover layer which is situated below the reinforcement layer, according to an embodiment of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range or dimension listed or described as being useful, suitable, or the like, is intended that any and every concentration or amount or dimension within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Conveyor belts according to the disclosure typically include an elastomeric body having a load carrying surface atop a carry cover layer, a parallel pulley engaging pulley cover layer, and a reinforcement containing carcass disposed within the elastomeric body of the belt. The reinforcement carcass typically includes one or more reinforcement layers, with optional intermediate layers disposed thereon. In some embodiments, the conveyor belts are formed as a continuous belt, and the ends cut and shaped in such way to enable splicing among the plurality of layers. In some aspects, stepped splice are used which insure that all layers in the splice seam do not approach a drive pulley simultaneously. These features, although not required, can improve the splice joint in some applications.

Now referencing FIG. 1 which illustrates an embodiment according to the disclosure. A conveyor belt 1 embodiment includes a carry cover layer 2 which is comprised of a synthetic and/or natural rubber based composition, a reinforcement layer 4 which situated below the carry cover layer 2, and a pulley cover layer 7 which is situated below the reinforcement layer 4. The pulley cover layer 7 is comprised of a synthetic and/or natural rubber based composition. In this embodiment, the reinforcement layer 4 includes a plurality of steel reinforcing elements 6 which are embedded within the rubber matrix 8 of the reinforcement layer 4, and disposed in an orientation essentially parallel with the longitudinal direction of the conveyor belt 1. The plurality of steel reinforcing elements 6 may, in some cases, be zinc-coated steel cords.

Figure 2:
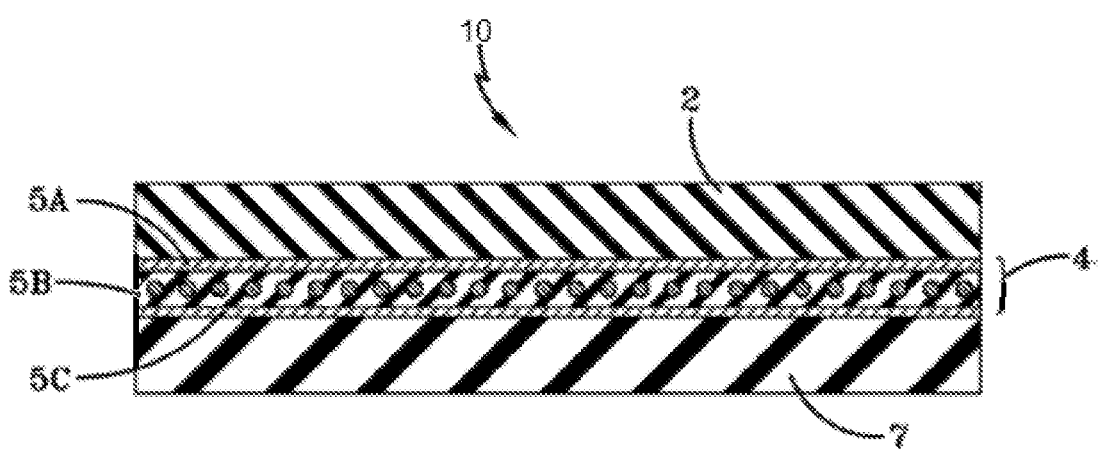
FIG. 2 is a cross-sectional view of a conveyor belt having a carry cover layer, a reinforcement layer which is situated below the carry cover layer, where the reinforcement layer includes three layers of reinforcements, and a pulley cover layer which is situated below the reinforcement layer, according to another embodiment of the disclosure.

In some other embodiments, as depicted for conveyor belt 10 in FIG. 2, the reinforcement layer 4 may include a first layer of reinforcement 5A, a second layer of reinforcement 5B reinforcement layer including a plurality of steel reinforcing elements in a rubber matrix, and a third layer of reinforcement 5C. However, in alternative embodiments the reinforcement layer 4 can contain two layers of reinforcement, or four or more layers of reinforcement.

In embodiments of the disclosure, one or more of the carry cover layer 2, the pulley cover layer 7, or rubber matrix 8 of the reinforcement layer(s) contain zinc oxide (ZnO) in amounts greater than conventional levels, and in combination with one or more cobalt derivatives. By significant increasing the amount of zinc oxide, either alone or in combination with cobalt derivative(s), and other optional additional ingredients, the resistance of the bonding to the zinc coated steel cord against aging processes (i.e. thermal and/or humidity exposure) is improved. Such discovery is counter to previous teachings where negative effects on rubber adhesion to brass-plated steel cord surface at higher ZnO concentrations were found.

Figure 3:
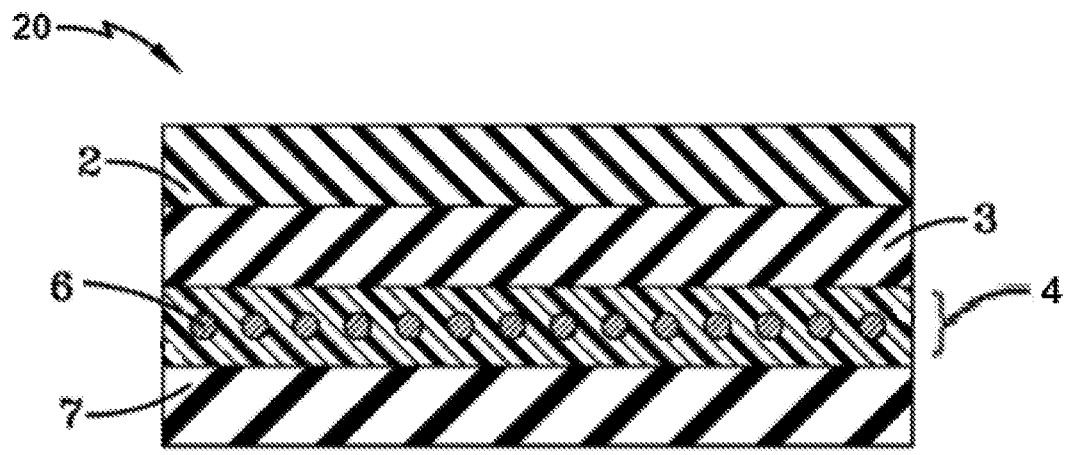
FIG. 3 is a cross-sectional view of a conveyor belt having a carry cover layer, a second layer in the cover, which is situated immediately below the carry cover layer, a reinforcement layer which is situated below the cover, and a pulley cover layer which is situated below the reinforcement layer, according to another embodiment of the disclosure; and, FIG. 4 is a cross-sectional view of a conveyor belt having a carry cover layer, a second layer in the cover, which is situated immediately below the carry cover layer, a reinforcement layer which is situated below the cover, a pulley cover layer which is situated below the reinforcement layer, and another layer situated immediately adjacent the pulley cover layer, before the reinforcement layer, according to another embodiment of the disclosure.
Figure 4:
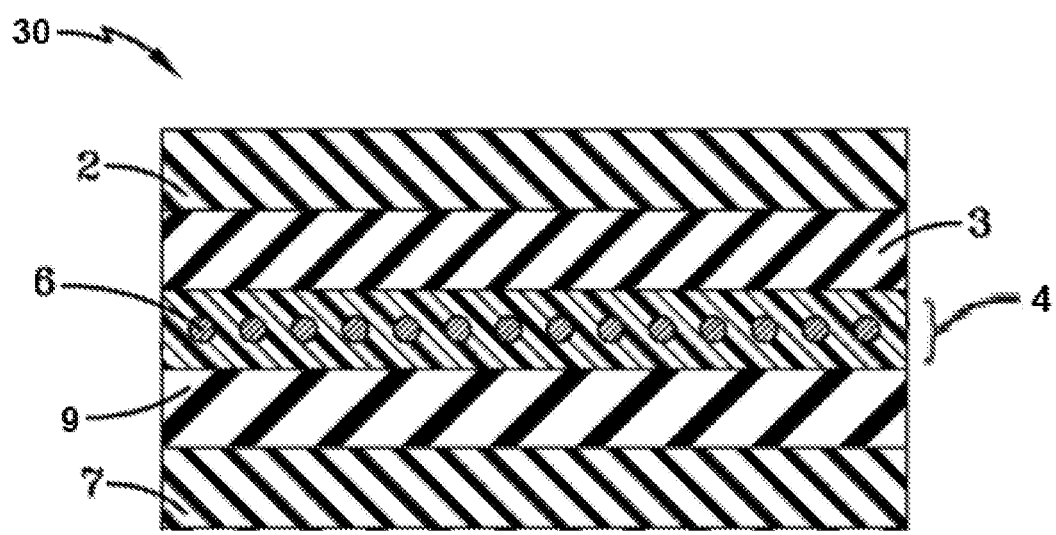

While FIGS. 1 and 2 depict a carry cover layer and pulley cover layer which are each formed of one layer of material, it is within the scope of this disclosure that any of the carry cover layer and pulley cover layer could be formed of multiple layers of materials. As illustrated in FIG. 3, in one embodiment of this disclosure, the conveyor belt 20 is reinforced with steel cords, and has a carry cover layer 2, a second layer 3 in the cover, which is situated immediately below the carry cover layer 2, a reinforcement layer 4 which includes steel cords 6 which are embedded in a rubber matrix, and a pulley cover layer 7 which is situated below the reinforcement layer 4. Similarly, as shown in FIG. 4, the pulley cover layer 7 may have another layer 9 situated immediately adjacent the pulley cover layer 7, before the reinforcement layer 4.

In accordance with the disclosure, in some cases, the amount of zinc oxide incorporated is greater than about 5 phr of the composition forming the particular layer(s). In some other cases, the amount of zinc oxide is about 11 phr or greater, of the composition forming the particular layer(s), and in some other embodiments, the amount of zinc oxide is about 16 phr or greater, of the composition forming the particular layer(s). In some embodiments, the amount of zinc oxide incorporated is from greater than about 5 phr to about 20 phr, of the composition forming the particular layer(s). In general, any suitable amount of zinc oxide may be incorporated at levels greater than about 5 phr of the composition forming the particular layer(s).

Embodiments according to the disclosure also include one or more cobalt derivatives employed synergistically with zinc oxide. Any suitable cobalt derivative is within the scope of the disclosure, and some non-limiting examples include cobalt salts, cobalt complexes such as cobalt octanoate, cobalt naphthenate, cobalt neodecanoate, cobalt stearate, and the like. One particularly useful cobalt derivative is cobalt neodecanoate, which is commonly available with a 20% cobalt content. The cobalt derivative may be incorporated in an amount of up to about 4 phr of the composition forming the particular layer(s). In some other cases, the amount of cobalt derivative is about 1 phr or greater, of the composition forming the particular layer(s), and in some other embodiments, the amount of cobalt derivative is about 2 phr to about 4 phr, of the composition forming the particular layer(s).

Any of a variety of natural or synthetic elastomeric materials suitable for conveyor belt applications may be used to form the carry cover layer 2, rubber matrix 8, and pulley cover layer 7, including, but not limited to elastomeric materials with resilient properties. In some aspects, the elastomeric material is a rubber selected from the group consisting of natural rubber (NR) and/or butadiene rubber (BR) and/or chloroprene rubber (CR) and/or chlorinated polyethylene (CPE) and/or styrene-butadiene rubber (SBR) and/or nitrile rubber (NBR, HNBR) and/or synthetic polyisoprene rubber and/or butyl rubber (IIR) and/or ethylene-propylene rubber (EPM) and/or ethylene-propylene-diene rubber (EPDM) and/or polyacrylate rubber (ACM) and/or isoprene-butadiene rubber and/or polybutadiene rubber and/or styrene-isoprene-butadiene rubber and/or ethylene-propylene-diene rubber and/or epichlorohydrin rubber (ECO) and/or chlorosulfonated polyethylene rubber (CSM) and/or silicone rubber (MVQ) and/or fluoro rubber (FPM).

The elastomeric materials used in forming conveyor belts in accordance with the disclosure may also include additives for enhancing flame retardancy, wear and chunk resistance, rolling resistance, aging resistance (e.g., ozone and UV resistance), and the like. Vulcanization aids, cross-linking agents, oils, accelerators, or other formation aids may also be used. Other polymers may also be included to obtain certain properties, such as polyacrylates, polyurethanes, melamine formaldehydes, polyesters, polyethers, and the like.

The reinforcing layers may also include any of a variety of other materials, in additional to steel cordage, either woven or non-woven, in any desirable weight and orientation, and is comprised of multiple individual plies separated by appropriate elastomeric or adhesive layers. Such materials may include a wide variety of wires, or even synthetic and manmade fibers, including polyester, nylon, aramid (e.g., Kevlar), glass, polypropylene, cellulose, wool, or others. The fibers may be multi-filament, monofilament, or staple fibers. In one embodiment, the reinforcing layer further includes one or more plies of polyester and/or nylon.

In some cases, the reinforcement layer(s) may include textile layers with filaments which are disposed in a direction transverse to the longitudinal direction of the conveyor belt. Referring again to FIG. 2, such textile layers may be incorporated in reinforcement layers 5A, 5C, or both 5A and 5C.

EXAMPLES

The following experimental data was generated for the purpose of further illustrating the nature of some of the embodiments and aspects of the disclosure, and are not intended as a limitation on the scope thereof. The following examples, shown in Table 1, were prepared to illustrate that embodiments of the disclosure provided improved bonding between a zinc coated steel cord surface and rubber matrix, while being exposed to thermal and humidity aging conditions. As a model system, zinc coated steel cords were embedded in rubber matrix adhesion compounds, containing different amounts of zinc oxide and cobalt derivative, and subjected to different aging conditions. In order to test the behavior of different compounds, the zinc coated steel cords embedded in the rubber matrix adhesion where formed into 10×10 mm T-Test-Block (with hot-dip galvanized steel cord 3×3×0.15 mm) and subjected to the following aging conditions: (a) Exsiccator for 14 days/70° C./95% humidity; and (b) autoclave water steam for 5 days/105° C. The results are shown in Table 2 below. The T-test preparation and testing procedure were performed according to ASTM D1871 and D2229.

As a second test method, rubberized zinc coated steel cords of 9.3 mm diameter were subjected to 24 hours rotation in a 10% salt water bath at room temperature. The rubber had been removed in a certain area, so that the water had access to the cord. The part of the cord that was afterwards evaluated, was completely inside the salt water solution throughout the conditioning time. After this conditioning, a peel test was conducted. The peel force level (c) and the appearance of the peeling surface (d) were evaluated, and the results are shown in Table 2 below. The peel force values are expressed in N/mm units.

TABLE 1

| Material | Ex. 1 | Ex. 2 | Ex. 3 |
| --- | --- | --- | --- |
| SBR 1500 | 81 | 81 | 81 |
| BR high cis | 19 | 19 | 19 |
| silica | 37 | 37 | 37 |
| TESPT 50% on carbon black | 4.3 | 4.3 | 4.3 |
| styrene resin (a) | 11 | 11 | 11 |
| plasticizer (high viscosity naphthenic oil) | 16 | 16 | 16 |
| carbon black N339 | 13 | 13 | 13 |
| carbon black N330 | 11 | 11 | 11 |
| zinc oxide | 5.4 | 16 | 16 |
| stearic acid | 1.1 | 1.1 | 1.1 |
| cobalt-boron-2-ethyl- | | | |
| hexanoate/neodecanoate (22.5 weight % Co) | 3.2 | 3.2 | 0 |
| cobalt neodecanoate (20.5 weight % Co) | 0 | 0 | 3.5 |
| sulfur | 1.9 | 1.9 | 1.9 |
| sulfur, insoluble (66%) | 1.9 | 1.9 | 1.9 |
| retarder CTP | 0.4 | 0.4 | 0.4 |

TABLE 1-continued

| Material | Ex. 1 | Ex. 2 | Ex. 3 |
|---|---|---|---|
| accelerator CBS | 1.4 | 1.4 | 1.4 |
| Resorcinol 80% in SBR | 4.3 | 4.3 | 4.3 |
| HMMM 65% on carrier (b) | 5.5 | 5.5 | 5.5 |
| 6PPD (antioxidant) | 1.1 | 1.1 | 1.1 |
| phr in total: | 219 | 229 | 230 |

(a) Hot polymerized emulsion high styrene resin with a typical styrene/butadiene ratio of 82.5/17.5%. ca. 3.4% resin/fatty acid mixture
(b) Methylated melamine formaldehyde resin. on an inert silica base (65% active ingredient)

The above example compounds were mixed with a standard mixing procedure (3-step process) in a laboratory mixer (Shaw K1 mark 4 Intermix). Resorcinol was added in the final pass at moderate dump temperature.

T-Test-Block test samples were prepared from two batches of each example, and each exposure/test was conducted 10 times for each batch. Zinc coated steel cord pullout testing was performed by a 10 kN universal tensile test machine (Zwick) with a pre-tension of 5 N and a test speed of 125 mm/min. The force at pullout was recorded in newtons (N). Samples exposed to the aging conditions were measured in comparison to control samples which were not exposed to any aging conditions. Pullout force results are shown in Table 2 columns "No aging", (a) and (b), as an average of the 20 pullout tests conducted for each, and the values are expressed in N units.

TABLE 2

|  | No Aging | (a) Exsiccator | (b) Autoclave | (c) 10% salt water | (d) 10% salt water visual |
|---|---|---|---|---|---|
| Ex. 1 | 351 | 126 | 51 | 26 | − |
| Ex. 2 | 358 | 173 | 123 | 23 | − |
| Ex. 3 | 367 | 200 | 190 | 37 | + |

In Table 2, the rating system for the visual (d) rubber coverage evaluation of the peel surface after 24 hours rotation in a 10% salt water bath at room temperature was as follows:
very poor coverage −−
low coverage −
medium coverage ○
improved coverage +
good coverage ++

While the foregoing embodiments described refer to conveyor belt embodiments, it is within the spirit and scope of the disclosure that the embodiments may also include any type of rubber article requiring improved adhesion between a rubber matrix and steel cordage, such as, but not limited to, hose, tires, power transmission belts, endless tracks, and the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE NUMERALS

1 Conveyor belt
2 Carry cover layer
3 Second Layer
4 Reinforcement layer
5A First layer of reinforcement
5B Second layer of reinforcement
5C Third layer of reinforcement
6 Steel reinforcing elements/steel cords
7 Pulley cover layer
8 Rubber matrix
9 Another layer
10 Conveyor belt
20 Conveyor belt
30 Conveyor belt

What is claimed is:

1. A conveyor belt which is comprised of a carry cover layer, a reinforcement layer which is situated below the carry cover layer, and a pulley cover layer which is situated below the reinforcement layer, wherein the reinforcement layer is comprised of steel cordage and a rubber matrix, wherein the rubber matrix comprises silica and styrene resin emulsion, wherein the rubber matrix further comprises zinc oxide in an amount greater than 16 phr and a cobalt derivative in an amount of 3 phr or greater, and wherein the steel cordage has a pullout force value of at least 123 N after exposure to autoclave water steam for 5 days/105° C.

2. The conveyor belt according to claim 1 wherein the rubber matrix comprises the zinc oxide in an amount of 17 phr or greater.

3. The conveyor belt according to claim 1 wherein the rubber matrix comprises the cobalt derivative in an amount of 3.5 phr or greater.

4. The conveyor belt according to claim 1 wherein the cobalt derivative is cobalt-boron-2-ethyl-hexanoate/neodecanoate.

5. The conveyor belt according to claim 1 wherein the cobalt derivative is cobalt neodecanoate.

6. The conveyor belt according to claim 1 wherein one or more of the carry cover layer, pulley cover layer, or rubber matrix comprises at least one rubbery polymer selected from the group consisting of styrene-butadiene rubber, synthetic polyisoprene rubber, nitrile rubber, isoprene-butadiene rubber, polybutadiene rubber styrene-isoprene-butadiene rubber, chloroprene rubber and ethylene-propylene-diene rubber.

7. The conveyor belt according to claim 1 wherein the carry cover layer includes zinc oxide at a level of greater than 16 phr and the cobalt derivative in an amount of 3 phr or greater.

8. The conveyor belt according to claim 1 wherein the pulley cover layer includes zinc oxide at a level of greater than 16 phr and the cobalt derivative in an amount of 3 phr or greater.

9. The conveyor belt according to claim 1 wherein one or more of the carry cover layer or the pulley cover layer, includes zinc oxide at a level of greater than 16 phr and the cobalt derivative in an amount of 3 phr or greater.

10. The conveyor belt according to claim 1 wherein one or more of the carry cover layer, the pulley cover layer, or the rubber matrix is devoid of lead oxide.

11. A conveyor belt which is comprised of a carry cover layer, a reinforcement layer which is situated below the carry cover layer, and a pulley cover layer which is situated below the reinforcement layer, wherein the reinforcement layer is comprised of zinc coated steel cords and a rubber matrix, wherein the rubber matrix comprises silica and styrene resin emulsion, wherein the rubber matrix further comprises zinc oxide in an amount greater than 16 phr and a cobalt derivative in an amount of 3 phr or greater, and wherein the steel cordage has a pullout force value of at least 123 N after exposure to autoclave water steam for 5 days/105° C., a rubber matrix, wherein the rubber matrix comprises silica and styrene resin emulsion, and wherein the rubber matrix further comprises zinc oxide in an amount greater than 16 phr and a cobalt derivative in an amount of 3 phr or greater; and wherein the steel cordage has a pullout force value of at least 123 N after exposure to autoclave water steam for 5 days/105° C.

12. The conveyor belt according to claim 11 wherein the rubber matrix comprises the zinc oxide in an amount of 17 phr or greater and the cobalt derivative in an amount of 3.5 phr or greater.

13. The conveyor belt according to claim 11 wherein the cobalt derivative is cobalt-boron-2-ethyl-hexanoate/neodecanoate.

14. The conveyor belt according to claim 11 wherein the cobalt derivative is cobalt neodecanoate.

15. The conveyor belt according to claim 11 wherein the rubber matrix is devoid of lead oxide.

* * * * *